(12) United States Patent
Bian et al.

(10) Patent No.: US 11,317,051 B2
(45) Date of Patent: Apr. 26, 2022

(54) VIDEO PROCESSING APPARATUS, METHOD AND SYSTEM

(71) Applicant: China Film GDC (Beijing) Technology Co., Ltd., Beijing (CN)

(72) Inventors: Wei Bian, Beijing (CN); Man Nang Chong, North Point (HK); Ruoqing Fu, Beijing (CN); Shuai Tan, Shenzhen (CN); Pranay Kumar, North Point (HK); Bin Xu, Beijing (CN); Rui Shen, Beijing (CN); Shuping Li, Beijing (CN)

(73) Assignee: China Film GDC (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/187,596

(22) Filed: Feb. 26, 2021

(65) Prior Publication Data

US 2022/0006970 A1 Jan. 6, 2022

(30) Foreign Application Priority Data

Jul. 2, 2020 (CN) .......................... 202010628050.X (51) Int. Cl.
| | |
|---|---|
| *H04N 5/783* | (2006.01) |
| *H04N 7/081* | (2006.01) |
| *H04N 7/01* | (2006.01) |
| *H04N 5/06* | (2006.01) |
| *H04N 5/93* | (2006.01) |

(52) U.S. Cl.
CPC .............. *H04N 5/783* (2013.01); *H04N 5/06* (2013.01); *H04N 7/0127* (2013.01); *H04N 7/081* (2013.01)

(58) Field of Classification Search
CPC .............. H04N 21/4405; H04N 21/44; H04N 21/8547; H04N 21/2347; H04N 21/8358; H04N 21/44016; H04N 21/234; H04N 21/23424; H04N 21/440281; H04N 21/234381
USPC .......................... 386/343, 345, 350, 326, 278
See application file for complete search history.

(56) References Cited

U.S. PATENT DOCUMENTS

| | | | |
|---|---|---|---|
| 2018/0277164 A1* | 9/2018 | Wang | ..................... H04N 21/84 |
| 2020/0210768 A1* | 7/2020 | Turkelson | .......... G06K 9/00751 |
| 2021/0360047 A1 | 11/2021 | Li | |

FOREIGN PATENT DOCUMENTS

| | | | |
|---|---|---|---|
| CN | 108924592 A | | 11/2018 |
| CN | 110049336 A | | 7/2019 |
| JP | 10-2010-0065318 | * | 6/2010 |

* cited by examiner

*Primary Examiner* — Robert Chevalier
(74) *Attorney, Agent, or Firm* — Morrison & Foerster LLP (57) ABSTRACT

The present invention relates to a video processing apparatus, method, and system. In particular, in accordance with one embodiment, high-speed video is divided into at least two sub-videos having a frame rate lower than that of the input video, during which metadata for synchronization of the two sub-videos which corresponds to frames of each sub-video is generated, and inserted into the respective sub-videos for video processing in parallel. During the parallel processing of the sub-videos, the system monitors and controls the synchronization of the process and, upon completion of the sub-video processing, use the metadata to re-assemble the sub-videos into one high-speed video stream for output, the output video having the same frame rate as the received input video stream.

24 Claims, 4 Drawing Sheets

VIDEO PROCESSING APPARATUS, METHOD AND SYSTEM

CROSS-REFERENCE TO RELATED APPLICATIONS

This applications claims priority 35 U.S.C. § 119 to Chinese patent application CN 202010628050.X, filed Jul. 2, 2020, the contents of which are incorporated by reference herein in their entirety.

TECHNICAL FIELD

The present disclosure relates to a video processing apparatus, a video processing method and a corresponding computer-readable medium, and a video processing system. In particular, the present disclosure relates to an apparatus, a method, and a system that process a video with high frame rate (e.g., a movie) for playback.

BACKGROUND

Traditionally, analog film movies were shot and presented at a frame rate of 24 frames per second (FPS) and a relatively low resolution. With the development of film industry technology, digital film technology has been used in recent years to replace analog film technology for shooting, processing, and presentation of moving pictures. The use of digital film technology makes it possible to shoot and present movies at higher frame rates and higher resolutions so as to provide the highest possible viewing experience.

However, processing a video with high resolution and high frame rate (such as a 3D movie in 120 FPS and 4 K) results in extremely high demands on the capabilities of related device(s) and related processing technologies. Presently, there is no corresponding device or module that can directly process a video with high resolution and high frame rate.

In particular, all current digital movie playback devices need to comply with Digital Cinema Initiative (DCI) standard. The DCI standard has extremely strict and unique requirements in terms of the accuracy of data processing algorithms and the security of media assets (for example, very high quality compression/decompression processing is required and compliance with Digital Rights Management (DRM) standard is required), therefore, directly development of corresponding modules/devices that process a video with high resolution and high frame rate (for example, modules/devices for compression/decompression, encryption/decryption, and/or processes corresponding to media asset security such as watermark processing) will result in excessive costs in terms of time and money, etc. In addition, even if the corresponding modules/devices that process a video with high resolution and high frame rate are directly developed, it may result in a relatively long processing time because a large amount of data due to high resolution and high frame rate needs to be processed, thereby causing relatively long delay during real-time playback.

Therefore, there is a need for a solution that can effectively process a video/movie with high frame rate.

SUMMARY

The present disclosure proposes a solution that can effectively process a video/movie with high frame rate.

According to one aspect of the present disclosure, there is proposed a video processing apparatus, comprising a circuitry for input video processing configured to: split an input video into two sub-videos having a frame rate lower than that of the input video, and generate metadata for synchronization of the two sub-videos which corresponds to frames of each sub-video, and add the metadata into respective sub-videos; two circuitries for sub-video processing, each configured to process one sub-video split out by the circuitry for input video processing; a circuitry for synchronization of sub-video processing configured to monitor and control the circuitries for sub-video processing based on the metadata such that the processing on the sub-videos between the two circuitries for sub-video processing is synchronized; and a circuitry for sub-videos assembly configured to assemble the processed two sub-videos into an output video having the same frame rate as the input video based on the metadata.

According to one aspect of the present disclosure, there is proposed a method for video processing, comprising: splitting an input video into two sub-videos having a frame rate lower than that of the input video; generating metadata for synchronization of the two sub-videos which corresponds to frames of each sub-video, and adding the metadata into respective sub-videos; performing, by two sub-video processing pipelines, parallel processing on the two sub-videos split out; monitoring and controlling the two sub-video processing pipelines based on the metadata such that the processing on the sub-videos between the two sub-video processing pipelines is synchronized; and assembling the processed two sub-videos into an output video having the same frame rate as the input video based on the metadata.

According to one aspect of the present disclosure, there is proposed a video processing device, the video processing device comprising a processor and a memory having computer-executable instructions stored thereon, when the computer-executable instructions are executed by the processor, cause the processor to perform the method for video processing as described in the disclosure.

According to one aspect of the present disclosure, there is proposed a computer-readable medium having computer-executable instructions stored thereon, when the computer-executable instructions are executed by a processor, cause the processor to perform the method for video processing as described in the present disclosure.

According to one aspect of the present disclosure, there is proposed a video processing system, comprising: a device for input video processing configured to split an input video into two sub-videos having a frame rate lower than that of the input video, and generate metadata for synchronization of the two sub-videos which corresponds to frames of each sub-video, and add the metadata into respective sub-videos; two devices for sub-video processing, each configured to process one sub-video split out by the device for input video processing; a device for synchronization of sub-video processing configured to monitor and control the devices for sub-video processing based on the metadata such that the processing on the sub-videos between the two devices for sub-video processing is synchronized; and a device for sub-videos assembly configured to assemble the processed two sub-videos into an output video having the same frame rate as the input video based on the metadata.

DRAWINGS

The drawings incorporated herein and forming a part of the specification illustrate embodiments of the present disclosure, together with the description served to explain the principles of the present disclosure.

DETAILED DESCRIPTION

Hereinafter, preferred embodiments of the present disclosure will be described in detail with reference to the accompanying drawings.

In this section, representative applications of apparatus and methods according to the implementations described herein are provided. These examples are provided only for adding context and helping to understand the described implementations. It will therefore be apparent to those skilled in the art that the implementations described in this disclosure can be embodied without some or all of these specific details. In other instances, well-known process steps have not been described in detail so as to avoid obscuring the implementations described in the disclosure unnecessarily. Other applications are also possible, so that the following examples should not be considered limiting.

Note that similar reference numerals and letters refer to similar items in the figures, thus once an item is defined in one figure, it does not need to be discussed in following figures.

As described above, there is currently no corresponding device or module that can process a video with high resolution and high frame rate directly. Direct development of corresponding modules/devices that process a video with high resolution and high frame rate will result in excessive costs in terms of time and money, etc., and may result in a relatively long processing time and thereby result in relatively long playback delay.

In view of this, the present disclosure proposes a solution for processing a video with high resolution and high frame rate by utilizing corresponding modules/devices that comply with the DCI standard for processing a video with relatively low quality (for example, relatively low frame rate). In the following, a video processing solution according to an embodiment of the present disclosure will be briefly introduced with reference to FIG. 1.

Figure 1:
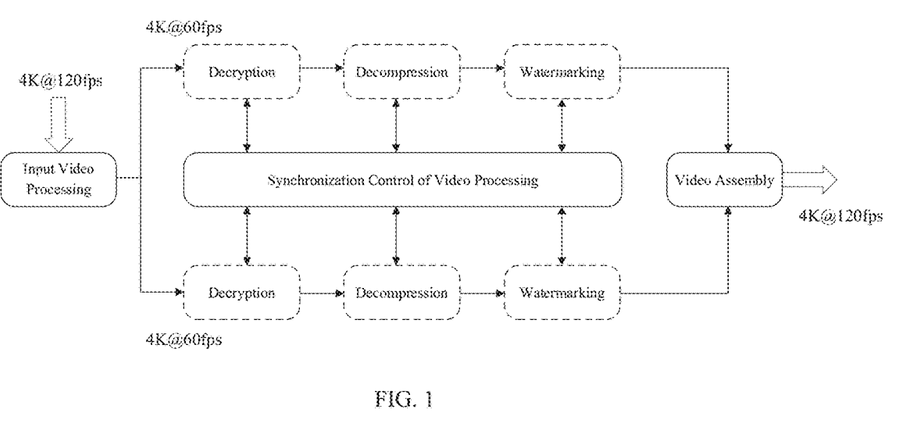
FIG. 1 is an overview of video processing according to an embodiment of the present disclosure.

As shown in FIG. 1, according to the present disclosure, in order to reduce R&D costs and reduce delay, the solution according to the present disclosure considers splitting an input video with high resolution and high frame rate (for example, 4K resolution, 120 FPS frame rate) to be processed into two videos with low frame rate (for example, videos each with 60 FPS), and performing, by utilizing two parallel processing pipelines for video with low frame rate, processing (such as decryption, decompression, and watermark processing as shown in dashed box) on the sub-videos split out, and finally assembling the processed sub-videos into an output video having the same resolution and frame rate as the input video. Since the frame rate of the sub-video allocated to each processing pipeline is reduced, the capacity requirements for modules/devices (e.g., the modules/devices corresponding to the processing shown in the dashed box) of each processing pipeline are reduced, thereby, advantageously, each processing pipeline can be realized with relatively small R&D costs, and even existing modules/devices that comply with the DCI standard for processing a video with low frame rate can be advantageously reused. In addition, since two sub-video processing pipelines process sub-videos in parallel and the amount of data need to be processed by each processing pipeline is reduced thanks to the reduction of frame rate, the processing speed is greatly increased, so that the delay for outputting a video can be advantageously reduced.

Note that co-dependency often exists between different frames within one same video. That is to say, some type of processing on a frame in an input video sometimes requires data obtained after performing the same type of processing on one or more frames adjacent to the frame, for example, for a frame compressed by means of inter-frame prediction, its decompressing requires the use of the decompressed data of neighboring frames (the example of co-dependency is not limited to this and will be described in more detail below). Therefore, in existing video processing solutions, frames of a video generally undergo a series of linearly arranged processing in time sequence from input to output. In other words, existing video processing solutions do not involve any technology related to running one same processing in parallel (for example, two processing pipelines simultaneously perform any one of the decryption operation, decompression operation, and watermark operation in parallel). Since an input video is split into two sub-videos for parallel processing according to the resolution of the present disclosure, appropriate video splitting operations, synchronization control of sub-videos processing, and video assembly operations need to be performed so that during parallel processing, frames having co-dependency can still be processed and an output video can be properly assembled while ensuring that each sub-video processing pipeline can properly process a sub-video. This will be described in detail below.

Figure 2:
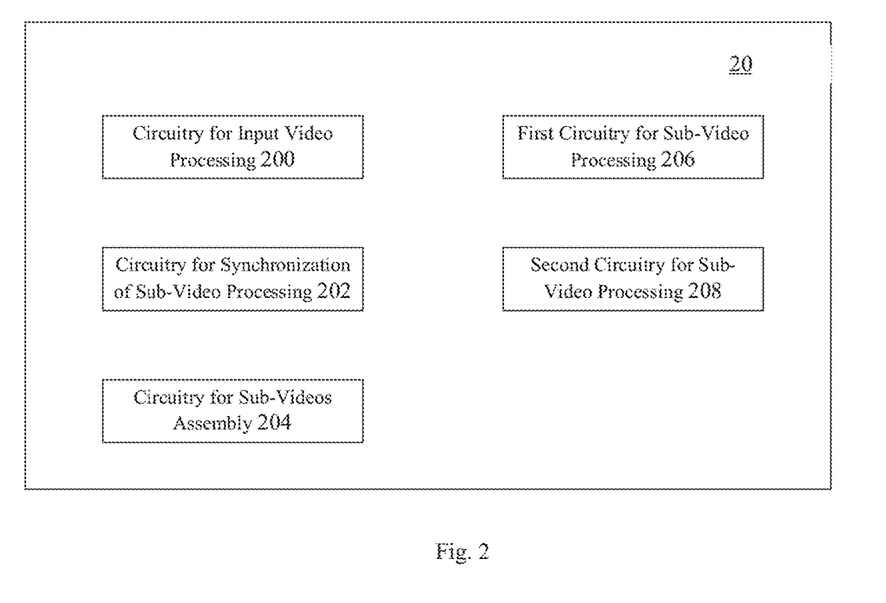
FIG. 2 is a schematic diagram of a schematic structural configuration of a video processing apparatus according to an embodiment of the present disclosure.

FIG. 2 is a schematic diagram of a schematic structural configuration of a video processing apparatus 20 according to an embodiment of the present disclosure. According to one embodiment of the present disclosure, the video processing apparatus 20 can be mainly composed of an integrated circuit (e.g., FPGA), and may include a circuitry for input video processing 200, a circuitry for synchronization of sub-video processing 202, a circuitry for sub-videos assembly 204, a first circuitry for sub-video processing 206 and a second circuitry for sub-video processing 208, and the video processing apparatus 20 can be configured to be able to send/receive data between the various circuitries. Although FIG. 2 illustrates the above five circuitries, the video processing apparatus 20 may include more circuitries (for example, circuitries that implement more refined sub-functionalities or circuitries that implement other functionalities) or fewer circuitries (for example, the possible combined circuitry of the above circuitries) according to the design and programming of the integrated circuit.

The circuitry for input video processing 200 is configured, for example, to split an input video into two sub-videos having a frame rate lower than that of the input video, and generate metadata for synchronization of the two sub-videos which corresponds to frames of each sub-video, and add the metadata into respective sub-videos.

Herein, an "input video" can be any suitable type of input video data/file. For example, the "input video" can be an MXF (Material eXchange Format) file defined by the Society of Motion Picture and Television Engineers (SMPTE), which is dedicated to the transmission of audio and video media content. According to the present disclosure, the "input video" may also be any other type/format of data/file as long as it contains input video content.

According to the present disclosure, the circuitry for input video processing 200 processes an input video in real time, so that an output video can be provided in real time via the processing of other circuitries, and therefore, there is no need to store a complete input/output video locally, thereby saving storage costs.

Figure 3:
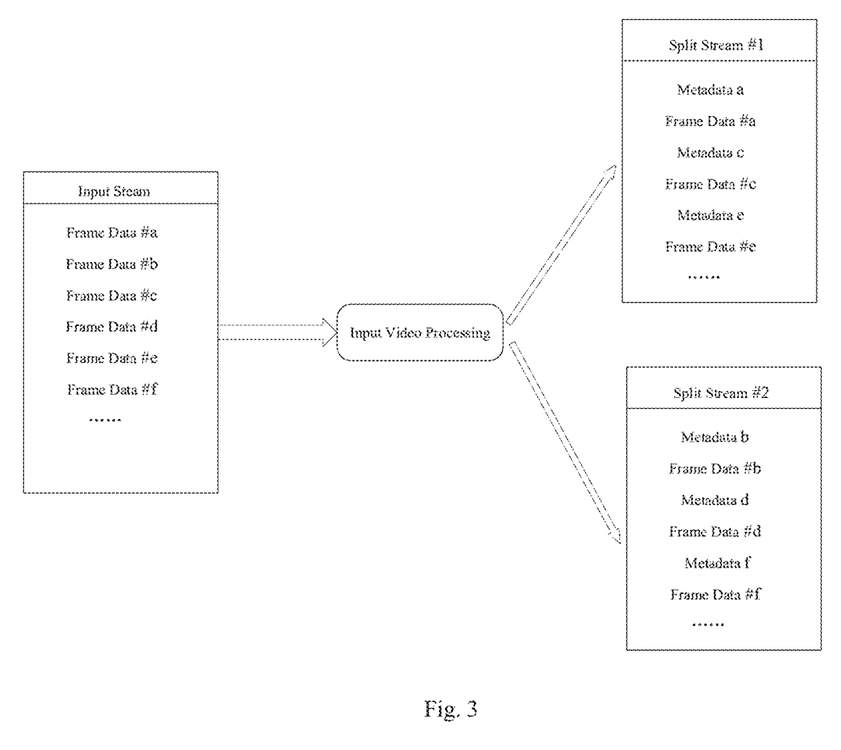
FIG. 3 is a schematic diagram of processing operations performed on an input video according to an embodiment of the present disclosure.

According to the present disclosure, the circuitry for input video processing 200 can split the input video into two sub-videos frame by frame such that two neighboring frames of the input video are split into different sub-videos, and the frame rate of each sub-video is the same. In other words, the circuitry for input video processing 200 may split the N-th frame of the input video into the first sub-video, and split the N+1-th frame into the second sub-video, where N is an integer greater than or equal to 1. For example, as shown in FIG. 3 in detail, the input video stream including the frames arranged in alphabetical order of a, b, c, d, e, f . . . is split into two sub-video streams numbered #1 and #2 via the input video processing performed by the circuitry for input video processing 200, where sub-video stream #1 contains the data of a-frame, c-frame, and e-frame . . . while sub-video stream #2 contains the data of b-frame, d-frame, f-frame.

According to the present disclosure, the input video is split into two sub-videos having the same frame rate. Advantageously, synchronization between sub-video processing can be more easily achieved by processing two sub-videos having the same frame rate, so that it is easier to process frames having co-dependency.

The above explains how to split an input video into two sub-videos frame by frame. In this way, an input video can be split into two sub-videos having the same frame rate easily and in real time. However, the solution of the present disclosure is not limited to this frame by frame splitting method, for example, an input video may also be split in the form of frame groups (for example, each frame group includes 2 or more frames), so that two neighboring frame groups are split into different sub-videos, and the frame rate of each sub-video is the same.

It should be noted that the input video stream according to the present disclosure is generally a video stream that is encrypted and compressed using a special method (for example, encrypted and compressed in accordance with DCI-compliant standards) so that even if the data is encrypted and compressed, the data constituting each frame can be identified by the circuitry for input video processing 200 through parsing, so that the input video can be split by frame.

According to the present disclosure, the circuitry for input video processing 200 can be configured to generate metadata for synchronization of the two sub-videos which corresponds to frames of each sub-video, wherein the metadata may indicate the sequence of frames of the input video. There are multiple ways to generate metadata. For example, frame numbers of the input video can be simply taken as the metadata. In this way, the circuitry for input video processing 200 can add directly to each frame a tag representing its original frame number. Alternatively, timestamps for outputting frames can be calculated as the metadata based on the frame rate of the input video. For example, in the case where an input video is processed in real time and played in real time, the circuitry for input video processing 200 may calculate respective timings to present frames of the output video at a display device according to current time and the frame rate of the input video (for example, 120 FPS), and add these timings as tags to each frame. There may also be other ways of generating metadata, as long as the metadata can indicate the sequence of frames.

According to the present disclosure, the circuitry for input video processing 200 can be configured to add metadata corresponding to each frame to the respective sub-videos, respectively. According to the present disclosure, metadata is added corresponding to the frame data in order to indicate the sequence of the current frame in the input video. As shown in FIG. 3 in detail, the circuitry for input video processing 200 generates metadata for each frame, and adds the metadata corresponding to frames to the respective sub-videos. For example, add corresponding a-metadata indicating the sequence of the frame in the input video to frame data #a, add corresponding b-metadata indicating the sequence of the frame in the input video to frame data #b, and so on.

Metadata can be directly embedded into respective frame data, or added to respective sub-video in a way separate from the frame data.

In the case where the metadata is embedded into the frame data, for example, the metadata can be added to the header of a data packet encapsulating with the frame data. For example, the metadata can be inserted into the header of a file containing the frame data (for example, the header of an MXF file). Or alternatively, the metadata can be added to the frame data as a specific field or label.

In the case where the metadata is added to respective sub-video in a way separate from the frame data, the circuitry for input video processing may send metadata as a separate file/data to each circuitry for sub-video processing before sending frames of the split sub-video to the respective circuitry for sub-video processing. In this case, any format of file/data can be employed to encapsulate the metadata, as long as the metadata can be interpreted by other circuitries (e.g., the circuitry for sub-video processing and the circuitry for synchronization of sub-video processing) of the video processing apparatus 20.

The first circuitry for sub-video processing 206 and the second circuitry for sub-video processing 208 are configured, for example, to process the sub-videos split out by the circuitry for input video processing 200. According to the present disclosure, the first circuitry for sub-video processing 206 and the second circuitry for sub-video processing 208 can perform parallel processing on two sub-videos by performing substantially the same operations. Therefore, the term "the circuitry for sub-video processing" is used hereinafter to represent any one of the first circuitry for sub-video processing 206 and the second circuitry for sub-video processing 208. In addition, hereinafter, the procedure of processing the input video by the first circuitry for sub-video processing 206 and/or the second circuitry for sub-video processing 208 can be referred to as a sub-video processing stream.

According to the present disclosure, the circuitries for sub-video processing can be configured to perform one or more of the following processing on the sub-video: decompression, decryption, and embedding additional information into the sub-video. For example, the circuitries for sub-video processing may use a decompression operation/algorithm corresponding to a compression operation/algorithm to decompress each frame of the sub-video. The circuitries for sub-video processing may also use a decryption operation/ algorithm corresponding to the encryption operation/algorithm to decrypt each frame of the sub-video. The sequence of decompression and decryption is performed in accordance with the sequence of compression and encryption of the input video. For example, in the case where the input video is processed by first compressing and then encrypting, the circuitries for sub-video processing first decrypts the sub-video and then decompresses it. Conversely, in the case where the input video is processed by first encrypting and then compressing, the circuitries for sub-video processing first decompresses the sub-video and then decrypts it.

Additionally or alternatively, the circuitries for sub-video processing can also embed additional information into the sub-video. For example, the additional information can be embedded into the sub-videos in any suitable way. Such additional information can be any information required when playing the output video. Such additional information can be generated (for example, in real time and continuously) by a device separate from the video processing apparatus 20 or by a separate circuitry not shown on the video processing apparatus. For example, such additional information can be sent to the circuitries for sub-video processing by the circuitry for synchronization of sub-video processing 202 described below.

For example, such additional information can be information related to the security of media assets. For example, such additional information can be invisible "watermark" information for specifying the system to play the video and the time to play the video. For example, the watermark information may include the ID of the system playing the video and the time when the video can be played, so as to assist in protecting media assets from any "piracy" behavior of recording and playing the video without permission.

Here, the operations that can be performed by the circuitries for sub-video processing are explained by way of example. It should be understood that the circuitries for sub-video processing may perform specific operations on the sub-video according to actual conditions. In other words, the circuitries for sub-video processing do not necessarily perform all three operations of decompression, decryption, and embedding additional information into the sub-video, but can only perform any one or two of the operations according to actual needs, or the circuitries for sub-video processing can also perform other operations required to play the video according to actual needs.

The circuitry for synchronization of sub-video processing 202 is configured, for example, to monitor and control the circuitries for sub-video processing based on the metadata generated by the circuitry for input video processing, such that the processing on the sub-videos between the two circuitries for sub-video processing is synchronized. As mentioned above, co-dependency often exists between different frames within one same video. Some type of processing on a frame in an input video sometimes requires data obtained after performing the same type of processing on one or more frames adjacent to the frame. Keeping the processing between the circuitries for sub-video processing synchronized may enable both circuitries for sub-video processing to process frames having co-dependency in a timely manner, and makes it easy to assemble the output video in real time in subsequent operations without buffering large amounts of data.

According to the present disclosure, the circuitry for synchronization of sub-video processing 202 can monitor the circuitries for sub-video processing to acquire information related to the frame being processed by the circuitries for sub-video processing, for example, the information may include metadata corresponding to the frame and the type of processing being performed (such as decompression, decryption, and embedding of additional information).

According to the present disclosure, the circuitry for synchronization of sub-video processing 202 can control the operations of the two circuitries for sub-video processing according to the information (especially metadata) acquired through monitoring, such that the operations of the first circuitry for sub-video processing 206 and the second circuitry for sub-video processing 208 are synchronized. Here, the synchronization of operations between the circuitries for sub-video processing may indicate that one circuitry for sub-video processing does not perform a particular type of processing on a first frame indicated by the metadata until the other circuitry for sub-video processing has accomplished the particular type of processing on a second frame indicated by the metadata. In other words, synchronization may indicate, for example, keeping the processing speed/pace between the two circuitries for sub-video processing substantially the same, so that the difference between the processing speed of one circuitry for sub-video processing on frames and the processing speed of the other circuitry for sub-video processing on frames is less than a predetermined threshold. For example, such a "threshold" can be determined by information indicating the number of frames. For example, in the case that frame numbers are taken as metadata, the circuitry for synchronization of sub-video processing 202 can perform monitoring and control so that one circuitry for sub-video processing does not perform a particular type of processing on the frame numbered N until the other circuitry for sub-video processing has accomplished the same particular type of processing on the frame numbered N±Thr, wherein N and Thr are both integers greater than or equal to 1, and Thr is a threshold expressed by the difference in frame numbers. For another example, in the case that output timestamps of frames are used as metadata, the circuitry for synchronization of sub-video processing 202 can perform monitoring and control so that one circuitry for sub-video processing does not perform a particular type of processing on a frame whose output timestamp is T, until the other circuitry for sub-video processing has accomplished the same particular type of processing on a frame whose timestamp is T±Thr, wherein Thr is a threshold expressed by the difference in timestamps of the frames to be output.

According to the present disclosure, the circuitry for synchronization of sub-video processing 202 may control the first and/or second circuitries for sub-video processing to suspend/start certain processing on a certain frame by sending signal(s) to the first and second circuitries for sub-video processing.

It should be noted that the "synchronization" described here mainly refers to the synchronization of the same type of processing between two parallel sub-video processing streams. In one same sub-video processing stream, such "suspending/starting" synchronization control may not be performed between different types of processing. For example, the synchronization control causes the first circuitry for video processing not to decompress the frame numbered 5 until the second circuitry for sub-video processing has accomplished the decompression on the frame numbered 6. However, this does not affect other processing by the first/second circuitry for video processing on other frames. For example, the first circuitry for video processing may perform the operation of embedding watermark information into the frame numbered 3 and the operation of decrypting the frame numbered 7 while waiting for the decompression on the frame numbered 5.

According to the present disclosure, the circuitry for synchronization of sub-video processing 202 can also be configured to perform control for transferring data between the first circuitry for sub-video processing and the second circuitry for sub-video processing, such that the first and/or second circuitry for sub-video processing are able to perform processing on one or more frames having co-dependency between the sub-videos with the transferred data, wherein, a frame having co-dependency between sub-videos refers to a frame on which the processing to be performed requires data based on one or more frames of the other sub-video (i.e., the sub-video processed by the other circuitry for sub-video processing).

For example, when performing decompression processing, the circuitry for synchronization of sub-video processing 202 may be required to perform such control for transferring data. For example, according to some compression algorithms (such as those involving inter-frame prediction), decompressing a frame (for example, decompressing the frame numbered 2) may require to use data of decompressed neighboring frame(s) (for example, it is necessary to use part or all of data of the decompressed frame numbered 1). As another example, according to some compression algorithms (such as MPEG2/MPEG4), parameters (such as quantization parameters, for example) for decompressing other frames are contained in the data of one or more key frames of the compressed video stream (for example, in the header(s) of the key frame(s)). In this case, a frame of a sub-video involved in one sub-video processing pipeline (for example, the sub-video processing pipeline for which the first circuitry for sub-video processing 206 or the second circuitry for sub-video processing 208 is responsible) may lack such key frame data, therefore, it is necessary to transfer this key frame data to another sub-video processing pipeline in time.

In any of the above examples, the circuitry for synchronization of sub-video processing 202 can determine, according to a pre-agreed compression algorithm, decompression of which frames indicated by the metadata requires data from corresponding frames of the other sub-video, what specific data needs to be transferred and when this kind of data needs to be transferred. The circuitry for synchronization of sub-video processing 202 can monitor two sub-video processing streams (for which the first circuitry for sub-video processing 206 and the second circuitry for sub-video processing 208 is responsible, respectively, for example), and once it is detected that the data of the frame processed by the current sub-video processing stream needs to be used by the other sub-video processing stream, the transferring of required data is controlled between the two sub-video processing streams (for example, between the first circuitry for sub-video processing 206 and the second circuitry for sub-video processing 208). According to the present disclosure, data transferring between two sub-video processing streams can be achieved in any suitable manner. For example, the circuitry for synchronization of sub-video processing 202 may function as a repeater. When the circuitry for synchronization of sub-video processing 202 detects that the data of the frame processed by one circuitry for sub-video processing needs to be used by the other circuitry for sub-video processing, it can obtain respective data (for example, either all or part of the decompressed frame data, or the parameters contained in the decompressed key frame data, depending on different conditions) from the circuitry for sub-video processing, and forward the data to the other circuitry for sub-video processing. Alternatively, the circuitry for synchronization of sub-video processing 202 may only function as a controller for data transferring between two circuitries for sub-video processing. When the circuitry for synchronization of sub-video processing 202 detects that the data of the frame processed by one circuitry for sub-video processing needs to be used by the other circuitry for sub-video processing, it can control the circuitry for sub-video processing to directly send respective data to the other circuitry for sub-video processing.

For another example, when performing decryption processing, the circuitry for synchronization of sub-video processing 202 may be required to perform such control of data transferring. For example, according to some encryption algorithms, especially chained encryption algorithms, such as AES-CBC (Advanced Encryption Standard-Cipher Block Chaining), decryption of the N-th frame may require to use of the data from the decrypted N-lth frame. Therefore, it is necessary to transfer such data between the sub-video processing pipelines in a timely manner. In this case, the circuitry for synchronization of sub-video processing 202 can determine, according to a pre-agreed encryption algorithm, decryption of which frames indicated by the metadata requires data from corresponding frames of the other sub-video, what specific data needs to be transferred and when this kind of data needs to be transferred. The circuitry for synchronization of sub-video processing 202 can monitor two sub-video processing streams (for which the first circuitry for sub-video processing 206 and the second circuitry for sub-video processing 208 is responsible, respectively, for example), and once it is detected that the data of the frame processed by the current sub-video processing stream needs to be used by the other sub-video processing stream, the transferring of required data is controlled between the two sub-video processing streams (for example, between the first circuitry for sub-video processing 206 and the second circuitry for sub-video processing 208). As explained above with reference to the decompression operation, data transferring between two sub-video processing streams can be achieved in any suitable manner. For example, the circuitry for synchronization of sub-video processing 202 may function as a repeater, or may function as a controller for data transferring between two circuitries for sub-video processing.

For another example, when embedding additional information into a sub-video, the circuitry for synchronization of sub-video processing 202 may be required to perform such control of data transferring. As described above, for example, such additional information can be invisible "watermark" information for specifying the system to play the video and the time to play the video. Various parts of such additional information, such as watermark information, may need to be inserted into frames of video data with the correct order in a linear manner, so that a playback end device (such as a watermark analyzer) can read various parts of the additional information in a linear manner to correctly interpret the additional information. According to the present disclosure, since an input video is split into two sub-videos, for example, frame by frame, frames processed by each circuitry for sub-video processing are not actually linear, i.e., are not sequentially arranged in the original sequence of frames of the input video. In view of this, according to the present disclosure, the embedding of additional information into the sub-videos is controlled by the circuitry for synchronization of sub-video processing. The circuitry for synchronization of sub-video processing 202 is configured to, for example, transmit each part of the additional information in a correct order to the respective circuitry for sub-video processing, and monitor the circuitries for sub-video processing to embed each part of the additional information into the sub-videos in the correct order.

For example, the additional information that needs to be embedded into the sub-videos can be generated (for example, in real time and continuously) by a device separate from the video processing apparatus 20 or by a separate circuit not shown on the video processing apparatus 20. Taking watermark information as an example, watermark information can be generated by a device separate from the video processing apparatus 20 or by a separate circuit not shown on the video processing apparatus based on information such as the security clock and the system ID etc., and transmitted to the circuitry for synchronization of sub-video processing 202. As another example, such additional information may also be stored on a storage apparatus separate from the video processing apparatus 20 or a memory not shown on the video processing apparatus 20, and the circuitry for synchronization of sub-video processing can read (e.g., in real time) the additional information so as to control to embedding it into the sub-videos to be processed.

The circuitry for synchronization of sub-video processing 202 can continuously receive various parts of additional information to be embedded into sub-videos from the outside (i.e., a device separated from the video processing apparatus 20 or a separate circuit on the video processing apparatus 20). Or, the circuitry for synchronization of sub-video processing 202 can continuously read various parts of additional information to be embedded into sub-videos from an external storage device or a memory of the video processing apparatus 20.

The circuitry for synchronization of sub-video processing 202 can determine which part of additional information is to be embedded in the frame being processed based on the monitoring of the current processing of each circuitry for sub-video processing, and can transmit this part to the respective circuitry for sub-video processing. At the same time, after transmitting the respective part of additional information to the respective circuitry for sub-video processing, the circuitry for synchronization of sub-video processing 202 can also monitor the circuitry for sub-video processing to determine that the circuitry for sub-video processing has correctly embedded this part of additional information. For example, the correct embedding of additional information can be verified based on parity bit(s) or the like. In this way, the circuitry for synchronization of sub-video processing 202 can schedule the embedding of additional information, so that each part of additional information is embedded in each frame of the sub-video in the correct order.

The circuitry for synchronization of sub-video processing 202 can be further configured to: in the case that failure in processing on a frame by one circuitry for sub-video processing is recognized based on monitoring, perform a correction control to make the processing on the sub-videos between the two circuitries for sub-video processing be synchronized, wherein, the correction control comprising controlling the circuitry for sub-video processing to insert a blank frame or repeat the last frame, or controlling the other circuitry for sub-video processing to drop a frame corresponding to the frame. For example, in the case where additional information needs to be linearly embedded as described above, such correction control is critical, because if no correction operation is done for the failure of processing on a frame, it may cause various parts of additional information not to be embedded into the sub-videos in a correct order, resulting in the playback end being unable to correctly interpret the additional information and thus unable to play the video.

According to the present disclosure, the circuitry for synchronization of sub-video processing 202 can detect whether a certain frame or frames are lost in any sub-video processing stream by analyzing metadata corresponding to the frames being processed by the circuitry for sub-video processing. For example, in the case that frame numbers are taken as metadata, the circuitry for synchronization of sub-video processing 202 can calculate the difference between the frame number of the current frame that is undergoing a certain type of processing in a certain sub-video processing stream and the frame number of the last frame that has undergone this type of processing in this sub-video processing stream based on the metadata. Or, in the case that timestamps are taken as metadata, the circuitry for synchronization of sub-video processing 202 can calculate the difference between the timestamp of the current frame that is undergoing a certain type of processing in a certain sub-video processing stream and the timestamp of the last frame that has undergone this type of processing in this sub-video processing stream based on the metadata. The circuitry for synchronization of sub-video processing 202 can determine whether one or more frames are lost in the sub-video processing stream for this type of processing according to the result of the calculation of the difference described above. In the case it is determined a frame has been lost, the circuitry for synchronization of sub-video processing 202 may determine that this type of processing on the lost frame by the sub-video processing stream failed. Additionally or alternatively, when the processing on a certain frame by the circuitry for sub-video processing failed, the circuitry for sub-video processing may also signal this failure to the circuitry for synchronization of sub-video processing 202, so that the circuitry for synchronization of sub-video processing 202 can perform subsequent processing of correction control.

When the circuitry for synchronization of sub-video processing 202 recognizes failure in any type of processing on a certain frame by one circuitry for sub-video processing through monitoring, it can signal the circuitry for sub-video processing to use a blank frame as the result data obtained after processing on the frame, or alternatively, use the data obtained after performing the same type of processing on the last frame as the result data obtained after processing on the frame. In this way, the sequence of frames of an input video will not be disturbed due to a failure in a certain type of processing on a certain frame by a certain circuitry for sub-video processing, thereby avoiding that correct output video cannot be obtained. Alternatively, when the circuitry for synchronization of sub-video processing 202 recognizes failure in any type of processing on a certain frame by one circuitry for sub-video processing through monitoring, it can signal the other circuitry for sub-video processing to discard a frame corresponding to the frame (for example, a frame whose number is adjacent to the number of the frame). Advantageously, through this kind of simple correction control of inserting a blank frame/repeating the last frame or discarding a corresponding frame, the problem of failing to properly generate the output video due to failure in processing on individual frames in any sub-video processing pipeline running in parallel is avoided.

The circuitry for sub-video assemble 204 is configured to assemble the two processed sub-videos, for example, such that the sequence of the frames of the output video is the same as the sequence of the frames of the input video.

According to the present disclosure, the circuitry for sub-videos assembly 204 may assemble the processed two sub-videos based on the metadata such that the processed frames are arranged in the output video in the same order as the input video. After determining the sequence of the frames in the output video according to the metadata, the circuitry for sub-videos assembly can remove the metadata corresponding to the frames, so that the final output video does not contain any metadata.

The structural configuration of the video processing apparatus 300 according to the present disclosure has been described in detail above. Next, a schematic operation flow 40 of the video processing apparatus according to the embodiment of the present disclosure will be explained with reference to FIG. 4.

Figure 4:
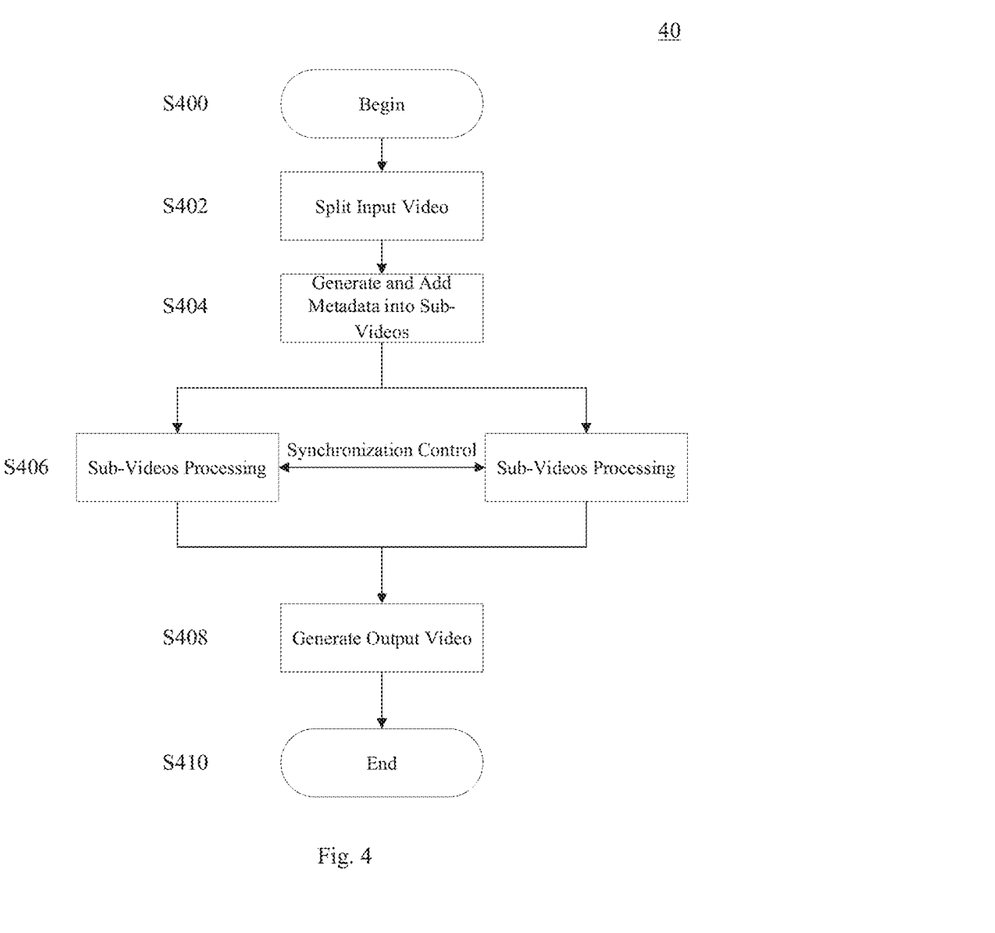
FIG. 4 is a flowchart of a schematic operation flow of a video processing apparatus according to an embodiment of the present disclosure.

As shown in FIG. 4, the operation flow 40 starts at step S400. Subsequently, the video processing apparatus splits an input video into two sub-videos having low frame rate at step S402, so as to realize processing on an input video having high frame rate by processing on sub-videos in parallel. As described above, an input video can be split into two sub-videos having the same low frame rate frame by frame or in units of frame groups.

Next, at step S404, metadata for synchronization of the two sub-videos which corresponds to frames of each sub-video is generated, and the metadata is added into respective sub-videos. As described above, the metadata may indicate the sequence of frames of the input video, and metadata is added corresponding to the frame data in order to indicate the sequence of the current frame in the input video.

Subsequently, at step S406, sub-videos are processed by two parallel sub-video processing pipelines, and the processing of the two sub-video processing pipelines is subjected to the synchronization control described above. Here, the processing on the sub-video may include any one or more types of processing such as decryption, decompression, and addition of additional information, and the sequence between various types of processing can be determined according to actual conditions. As described above, the synchronous control of the two sub-video processing pipelines makes the pace of processing of the two sub-video processing pipelines substantially the same (i.e., the speed of the same type of processing is substantially the same), and enable the data required for processing the current frame to be transferred in a timely manner between the two sub-video processing pipelines. In this way, by using parallel running of processing pipelines for low frame rate and combining with appropriate synchronization control, processing (e.g., real-time processing) on videos having high frame rate can be effectively achieved.

Finally, at step S408, based on the metadata, the processed two sub-videos are assembled into an output video having the same frame rate as the input video, such that the final output video is as if it is obtained by directly processing on the input video through a single processing pipeline for high frame rate.

Finally, the processing flow ends at S410.

It is to be noted that the schematic operation flow 40 of the video processing apparatus according to the present disclosure is only illustrative, and those skilled in the art can modify the operation flow according to actual conditions. The order of the various steps can be adjusted according to the conditions or executed in parallel. For example, metadata for the frames split out can be generated and added to a corresponding sub-video while an input video is being split.

It should be understood that operations in the schematic operation flow 40 of the video processing apparatus according to the present disclosure can be performed in real time. That is to say, real-time parallel processing, synchronization control, and assembly control can be performed with the input of the input video data, thereby outputting the output video data corresponding to the input video data in real time. Of course, in some cases, the above operations may also be performed in non-real-time, for example, the final output video can be assembled in a unified manner after two sub-video processing streams having processed its complete sub-video respectively.

The video processing apparatus according to the embodiment of the present disclosure and its schematic operation flow have been described above with reference to the drawings. In particular, the video processing apparatus has been described with a structure including circuitries that realize individual functions. For example, the video processing apparatus can be mainly composed of hardware circuits. For example, hardware circuits can include any combination of combined logic circuits, clock storage devices (such as floppy disks, flip-flops, latches, etc.), finite state machines, memories such as static random access memories or embedded dynamic random access memories, custom designed circuits, programmable logic arrays, etc. Hardware circuits can be manufactured with the help of design information and manufacturing systems. Design information can be specified in any of a variety of suitable computer languages, including hardware description languages such as but not limited to: VHDL, Verilog, SystemC, SystemVerilog, RHDL, M, MyHDL, etc. The design information can be used by the manufacturing system to manufacture at least a portion of the hardware circuit. The manufacturing system may include any of various suitable elements configured to manufacture hardware circuits. This may include, for example, elements for depositing semiconductor materials (for example, on a wafer that may include a mask), removing materials, changing the shape of deposited materials, modifying materials (for example, by doping materials or modifying the dielectric constant using UV treatment), etc. The manufacturing system can also perform various tests for performing the manufactured circuits for correct operation.

Figure 5:
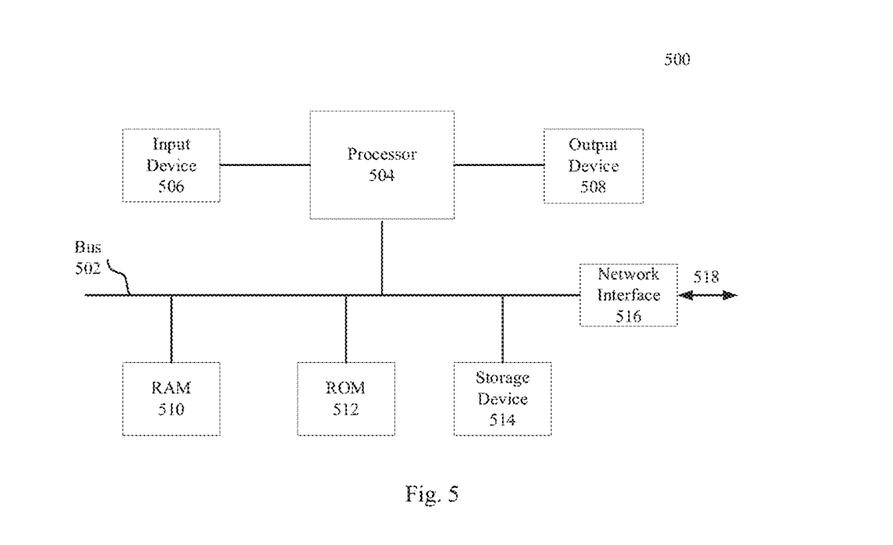
FIG. 5 is a schematic diagram of a video processing system according to an embodiment of the present disclosure.

In addition to the implementation in the form of a single apparatus including hardware circuits, the video processing solution of the present disclosure can also be implemented by a computer executing a software program for implementing the video processing method shown in FIG. 4. FIG. 5 shows an exemplary configuration of a computing device 500 that can implement an embodiment of the present disclosure. The computing device 500 can be any machine configured to perform processing and/or calculations. The computing device 500 can be, but not limited to, a workstation, a server, a desktop computer, a laptop computer, a tablet computer, a personal data assistant (PDA), a smart phone, an in-vehicle computer, or combination thereof.

As shown in FIG. 5, the computing device 500 can include one or more elements that may be connected to or communicate with the bus 502 via one or more interfaces. The bus 502 may include, but is not limited to, an Industry Standard Architecture (ISA) bus, a Micro Channel Architecture (MCA) bus, an enhanced ISA (EISA) bus, a Video Electronics Standards Association (VESA) local bus, and a Peripheral Component Interconnect (PCI) bus, etc. The computing device 500 may include, for example, one or more processors 504, one or more input devices 506, and one or more output devices 508. The one or more processors 504 can be any kind of processors, and may include, but are not limited to, one or more general purpose processors or special purpose processors (such as special purpose processing chips). The input device 506 can be any type of input device capable of inputting information to a computing device, and may include, but is not limited to, a mouse, a keyboard, a touch screen, a microphone, and/or a remote controller. The output device 508 can be any type of device capable of presenting information, and may include, but is not limited to, a display, a speaker, a video/audio output terminal, a vibrator, and/or a printer.

The computing device 500 may also include or be connected to a non-transitory storage device 514, which can be any non-transitory storage device that can implement data storage, and may include but not limited to a disk drive, an optical storage device, a solid-state memory, a floppy disk, a flexible disk, a hard disk, a magnetic tape or any other magnetic media, compact disks or any other optical media, cache memory and/or any other storage chips or modules, and/or any other media from which a computer can read data, instructions and/or code. The computing device 500 may also include random access memory (RAM) 510 and read-only memory (ROM) 512. The ROM 512 may store programs to be executed, utilities, or processes in a non-volatile manner. The RAM 510 may provide volatile data storage and store instructions related to operations of the computing device 500. The computing device 500 may also include a network/bus interface 516 coupled to the data link 518. The network/bus interface 516 can be any kind of device or system capable of enabling communication with external apparatus and/or networks, and may include, but is not limited to, a modem, a network card, an infrared communication device, a wireless communication device, and/or a chipset (such as a Bluetooth™ device, a 1302.11 device, a Wi-Fi device, a WiMax device, a cellular communication facility, etc.).

It should be further understood that the elements of the computing device 500 can be distributed throughout the network. For example, one processor can be used to perform some processing while other remote processor is used to perform other processing. Other elements of the computing device 500 can be similarly distributed. Therefore, the computing device 500 can be understood as a distributed computing system that performs processing at multiple locations.

In addition, the aforementioned implementations can be embodied as computer-readable code on a computer-readable medium. The computer-readable medium is any data storage device that can store data, which can thereafter be read by a computer system. Examples of computer-readable media include a read-only memory, random access memory, a CD-ROM, a DVD, a magnetic tape, a hard disk drive, a solid-state drive, and an optical data storage device. The computer-readable medium can also be distributed among network-coupled computer systems so that the computer-readable code is stored and executed in a distributed fashion.

Further, various aspects, implementations, specific embodiments or features of the aforementioned implementations can be used separately or in any combination. For example, various aspects of the aforementioned implementations can be implemented by software, hardware, or a combination of hardware and software.

Figure 6:
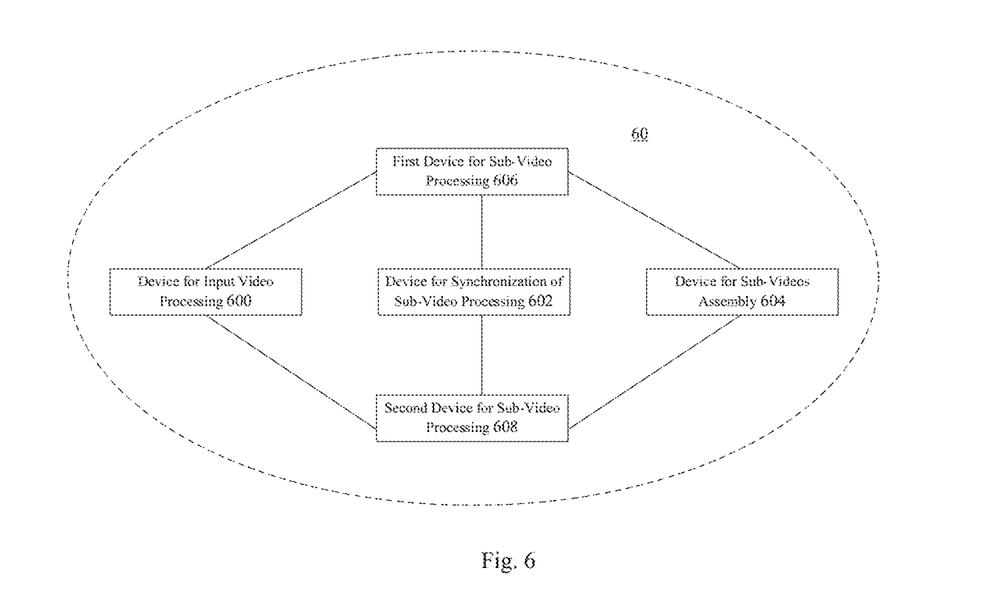
FIG. 6 is an exemplary configuration diagram of a computer device that can implement the embodiments according to the present disclosure.

In addition to the implementation in the form of a single apparatus, the video processing solution according to the present disclosure can also be implemented as the video processing system 60 shown in FIG. 6. The video processing system 60 can be configured to include, for example, a device for input video processing 600, a first device for sub-video processing 606, a second device for sub-video processing 608, a device for synchronization of sub-video processing 602, and a device for sub-videos assembly 604, where each device can realize corresponding functions through hardware, software, or a combination of hardware and software. The functions/operations implemented by the various devices included in the video processing system 60 are similar to the functions/operations described above with reference to the various circuitries of the video processing apparatus 20, and will not be repeated here.

The solid lines drawn in FIG. 6 represent communication lines for typical signal flows between various devices of the video processing system 60. For example, the input video processing device 600 can transmit the sub-videos split out and corresponding metadata to the first device for sub-video processing 606 and the second device for sub-video processing 608; the device for synchronization of sub-video processing 602 can transmit control signals to the first device for sub-video processing 606 and the second device for sub-video processing 608 and forward data between the two devices for sub-video processing when needed; the device for sub-videos assembly 604 can receive the processed sub-videos from the first device for sub-video processing and the second device for sub-video processing. It should be understood that these communication lines are only illustrative, and there can be other possible communication lines. For example, there can be a direct communication line between the first device for sub-video processing 606 and the second device for sub-video processing 608 to facilitate the transmission of data required for processing sub-videos.

According to the present disclosure, processing on videos having high resolution and high frame rate can be realized. Advantageously, since the solution according to the present disclosure utilizes processing pipelines for low frame rate video to process sub-videos split out from an input video, the capability requirements for modules/devices of each processing pipeline are reduced, thereby reducing the R&D costs for implementing each processing pipeline.

According to the present disclosure, since two sub-video processing pipelines process sub-videos in parallel, and the amount of data that each processing pipeline needs to process is reduced thanks to the reduction in frame rate, the speed of processing on the input video is advantageously increased by a large amount, so that the delay of the output video can be advantageously reduced. Therefore, the video processing solution of the present disclosure is particularly suitable for scenarios that require real-time processing on input video and output and playback of the output video in real time.

According to the present disclosure, by means of the synchronization control between the two sub-video processing pipelines, it can be advantageously enabled to process frames having co-dependency between sub-videos, and it is possible to correctly embed into each sub-video additional information that need to be arranged linearly in accordance with the sequence of frames of the input video, so that the final output video is as if it is obtained by directly processing on the input video through a single processing pipeline for high frame rate.

Although some specific embodiments of the present disclosure have been exhibited in detail by way of examples, those skilled in the art should understand that the above examples are intended to be illustrative only and not to limit the scope of the present disclosure. The above effects are merely illustrative effects, and the solution of the present disclosure may also have other technical effects. It should be appreciated that some of the steps in the aforementioned method are not necessarily performed in the order illustrated, but they can be performed simultaneously, in a different order, or in an overlapping manner. In addition, those skilled in the art may add some steps or omit some steps as needed. Some units in the foregoing apparatus do not have to be arranged as illustrated in figures, and those skilled in the art may add some units or omit some units as needed. Those skilled in the art should understand that the above-described embodiments can be modified without departing from the scope and essence of the present disclosure. The scope of the present disclosure is defined by the appended claims.

The invention claimed is:

1. A video processing apparatus, characterized in that the video processing apparatus comprising:
a circuitry for input video processing configured to:
split an input video into two sub-videos having a frame rate lower than that of the input video, and
generate metadata for synchronization of the two sub-videos which corresponds to frames of each sub-video, and add the metadata into respective sub-videos;
two circuitries for sub-video processing, each configured to process one sub-video split out by the circuitry for input video processing;
a circuitry for synchronization of sub-video processing configured to monitor and control the circuitries for sub-video processing based on the metadata such that the processing on the sub-videos between the two circuitries for sub-video processing is synchronized; and
a circuitry for sub-videos assembly configured to assemble the processed two sub-videos into an output video having the same frame rate as the input video based on the metadata.

2. The video processing apparatus of claim 1, wherein, the circuitry for input video processing is further configured to split the input video into two sub-videos frame by frame such that two neighboring frames of the input video are split into different sub-videos and the frame rate of each sub-video is the same.

3. The video processing apparatus of claim 1, wherein, the circuitry for sub-video processing is configured to perform one or more of the following processing on the sub-video: decompression, decryption and embedding additional information into the sub-video.

4. The video processing apparatus of claim 1, wherein the metadata indicates the sequence of frames of the input video.

5. The video processing apparatus of claim 4, wherein, the circuitry for input video processing is further configured to receive frame numbers of the input video as the metadata or calculate timestamps for outputting frames as the metadata based on the frame rate of the input video.

6. The video processing apparatus of claim 4, wherein the circuitry for synchronization of sub-video processing is further configured to control processing of each circuitry for sub-video processing such that one circuitry for sub-video processing does not perform a particular type of processing on a first frame indicated by the metadata until the other circuitry for sub-video processing has accomplished the particular type of processing on a second frame indicated by the metadata.

7. The video processing apparatus of claim 1, wherein the circuitry for synchronization of sub-video processing is further configured to perform control for transferring data between the circuitries for sub-video processing, such that the circuitries for sub-video processing are able to perform processing on one or more frames having co-dependency between the sub-videos with the transferred data, wherein, a frame having co-dependency between the sub-videos refers to a frame on which the processing to be performed requires data based on one or more frames of the other sub-video.

8. The video processing apparatus of claim 1, wherein, the circuitry for synchronization of sub-video processing is further configured to:
upon detecting failure in processing on a frame by one circuitry for sub-video processing, perform synchronization of the sub-video processing between two circuitries, wherein the synchronization includes controlling the circuitry for sub-video processing to insert a blank frame or repeat the last frame, or controlling the other circuitry for sub-video processing to drop a frame corresponding to the frame.

9. The video processing apparatus of claim 3, wherein, in the case of performing the processing of embedding additional information into sub-videos, the circuitry for synchronization of sub-video processing is further configured to transmit each part of the additional information in a correct order to the respective circuitry for sub-video processing and embed each part of the additional information into the sub-videos in the correct order.

10. The video processing apparatus of claim 1, wherein the circuitry for sub-videos assembly is further configured to assemble the processed two sub-videos such that the sequence of the frames of the output video is the same as the sequence of the frames of the input video.

11. A method for video processing, characterized in that the method for video processing comprising the steps of:
splitting an input video into two sub-videos having a frame rate lower than that of the input video;
generating metadata for synchronization of the two sub-videos which corresponds to frames of each sub-video, and adding the metadata into respective sub-videos;
performing, by two sub-video processing pipelines, parallel processing on the two sub-videos split out;
monitoring and controlling the two sub-video processing pipelines based on the metadata such that the processing on the sub-videos between the two sub-video processing pipelines is synchronized; and
assembling the processed two sub-videos into an output video having the same frame rate as the input video based on the metadata.

12. The method for video processing of claim 11, wherein splitting the input video into two sub-videos frame by frame such that two neighboring frames of the input video are split into different sub-videos and the frame rate of each sub-video is the same.

13. The method for video processing of claim 11 wherein, the processing on the sub-video comprising one or more of the following processing: decompression, decryption and embedding additional information into the sub-video.

14. The method for video processing of claim 11, wherein the metadata indicates the sequence of frames of the input video.

15. The method for video processing of claim 14, wherein, the method for video processing further comprising the step of:
receiving frame numbers of the input video as the metadata; or
calculate timestamps for outputting frames as the metadata based on the frame rate of the input video.

16. The method for video processing of claim 14, wherein controlling the two sub-video processing pipelines such that the processing on the sub-videos between the two sub-video processing pipelines is synchronized comprising: monitoring and controlling the two sub-video processing pipelines such that one sub-video processing pipeline does not perform a particular type of processing on a first frame indicated by the metadata until the other sub-video processing pipeline has accomplished the particular type of processing on a second frame indicated by the metadata.

17. The method for video processing of claim 1, further comprising the step of controlling the transfer of data between the sub-video processing pipelines, such that processing is able to be performed on one or more frames having co-dependency between the sub-videos with the transferred data, wherein a frame having co-dependency between the sub-videos refers to a frame on which the processing to be performed requires data based on one or more frames of the other sub-video.

18. The method for video processing of claim 11, wherein, the method for video processing further comprising the steps of detecting failure in processing on a frame by one sub-video processing pipeline, synchronizing the processing of sub-videos between the two sub-video processing pipelines.

19. The method for video processing of claim 18, wherein the synchronizing step includes controlling the sub-video processing pipeline to insert a blank frame or repeat the last frame, or controlling the other sub-video processing pipeline to drop a frame corresponding to the frame.

20. The method for video processing of claim 13, further comprising the steps of:
during the processing of embedding additional information into sub-videos, transmitting each part of the additional information in a correct order to the respective sub-video processing pipeline; and
embedding each part of the additional information into the sub-videos in the correct order.

21. The method for video processing of claim 11, further comprising the step of assembling the processed two sub-videos such that the sequence of the frames of the output video is the same as the sequence of the frames of the input video.

22. A video processing device, the electronic device comprising a processor and a memory having computer-executable instructions stored thereon, when the computer-executable instructions are executed by the processor, cause the processor to perform the method for video processing of claim 11.

23. A non-transitory computer-readable medium having computer-executable instructions stored thereon, when the computer-executable instructions are executed by a processor, cause the processor to perform the method for video processing of claim 11.

24. A video processing system, characterized in that the video processing system comprising:
a device for input video processing configured to:
split an input video into two sub-videos having a frame rate lower than that of the input video, and
generate metadata for synchronization of the two sub-videos which corresponds to frames of each sub-video, and add the metadata into respective sub-videos;
two devices for sub-video processing, each configured to process one sub-video split out by the device for input video processing;
a device for synchronization of sub-video processing configured to monitor and control the devices for sub-video processing based on the metadata such that the processing on the sub-videos between the two devices for sub-video processing is synchronized; and
a device for sub-videos assembly configured to assemble the possessed two sub-videos into an output video having the same frame rate as the input video based on the metadata.

* * * * *